Dec. 15, 1959  R. PRIES ET AL  2,917,191
RACK UNLOADER
Filed July 3, 1958  2 Sheets-Sheet 1
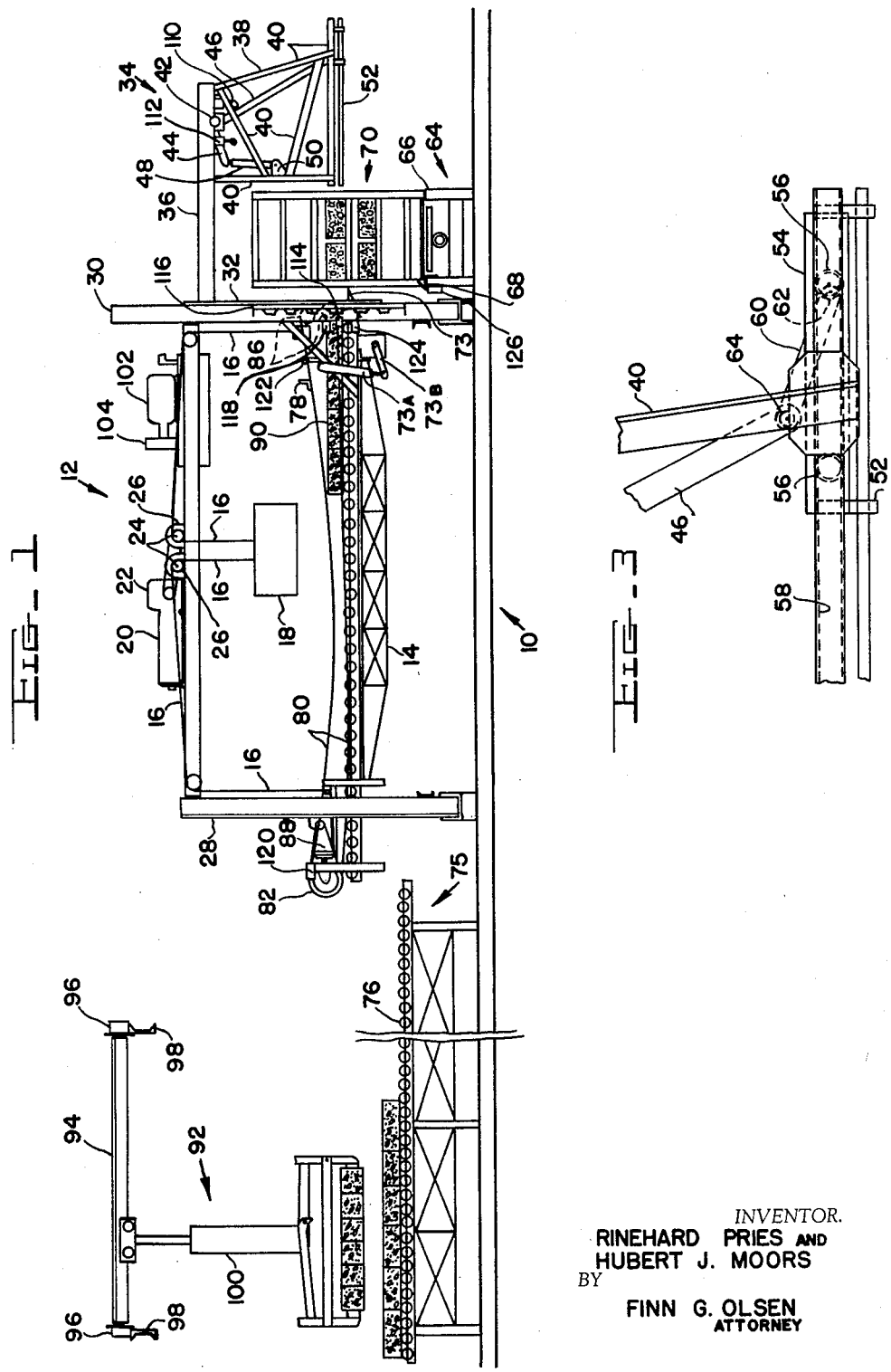
INVENTOR.
RINEHARD PRIES AND
HUBERT J. MOORS
BY
FINN G. OLSEN
ATTORNEY

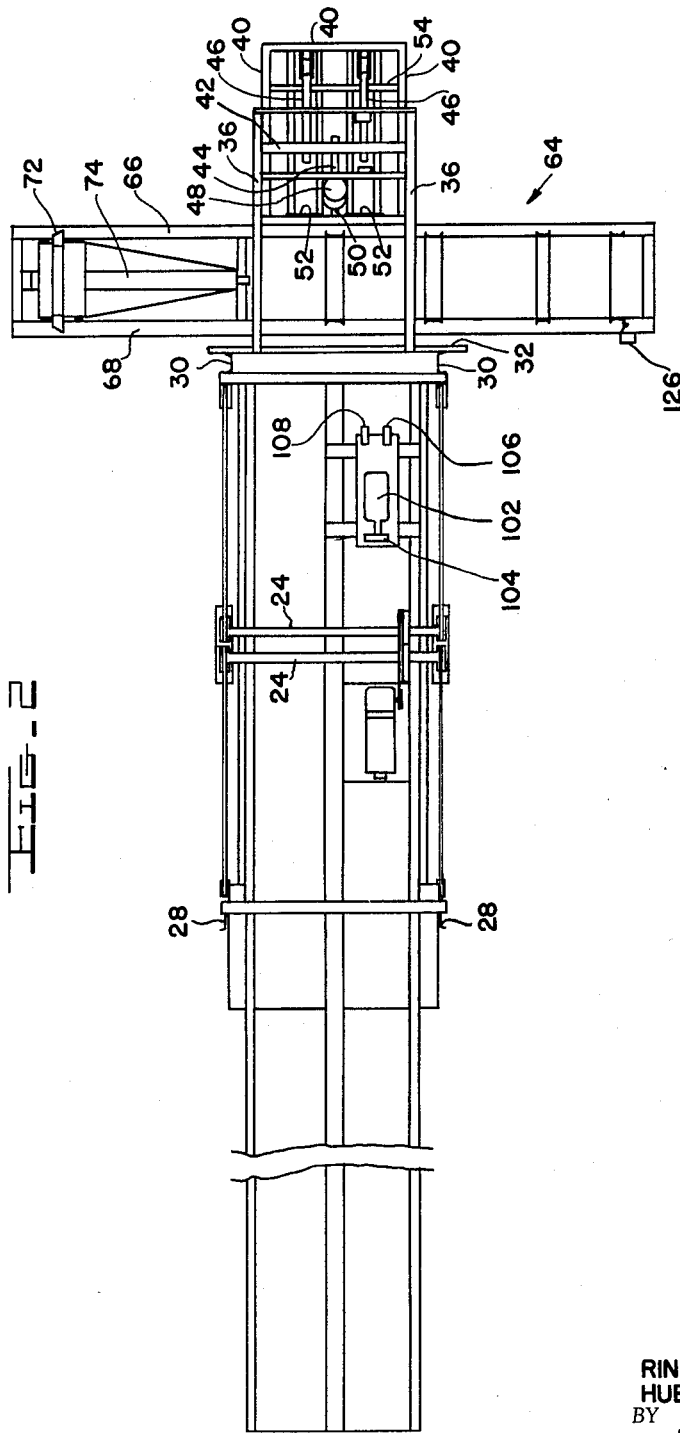

United States Patent Office 2,917,191
Patented Dec. 15, 1959

2,917,191

RACK UNLOADER

Rinehard Pries and Hubert J. Moors, Fraser, Mich., assignors to The Gene Olsen Corporation, Adrian, Mich., a corporation of Michigan Application July 3, 1958, Serial No. 746,473

12 Claims. (Cl. 214—16.4)

The present invention relates to apparatus for unloading building blocks from multi-deck racks during one of the stages of manufacture of the blocks.

In the manufacture of building blocks, the green blocks are initially formed in molds and are subsequently heated in order to harden or cure them. The molding of the blocks is generally accomplished continuously and automatically in molding machines. The green blocks are transferred from the molding machine on pallets which are carried on a conveyor. The latter carries the loaded pallets to a station where the loaded pallets are placed on multi-deck racks for transfer to autoclaves where the curing operation is performed.

Since this is a continuous operation, it is necessary that the maximum number of blocks be accommodated in the autoclave during each curing operation, and for this reason the decks of the racks are spaced as close together as is possible. As soon as the curing operation is completed the loaded racks are removed from the autoclave, and it is then desirable to remove the blocks from the racks and pallets so that such racks and pallets can be returned to the molding machine for further use. Prolonged storing of the cured blocks in the racks is uneconomical, because of the cost involved and the space required for keeping enough racks on hand to allow the continuous operation of the molding equipment.

It is the principal object of the present invention to provide apparatus for unloading molded blocks from pallets and multi-deck racks on which they have been cured, said apparatus being constructed and arranged to carry out the unloading operation automatically and in a simple and efficient manner.

It is another object of the present invention to provide apparatus of the foregoing character which employs an elevator adapted to stop at each level of the decks of said multi-deck racks and which carries a conveyor and block pusher in horizontal alignment but in spaced relation so as to be adapted to straddle the multi-deck racks and in sequence push the blocks from each deck onto the conveyor.

It is still another object of the present invention to provide an apparatus of the foregoing character which is constructed and arranged so that each pallet from which blocks are being removed will be engaged simultaneously with the engagement by the aforesaid block pusher of each block being unloaded, and by virtue of engaging such pallet, the pallet will be retained in place in the multi-deck rack.

It is still another object of the present invention to provide apparatus of the foregoing character which is constructed and arranged to transfer the cured blocks from the conveyor to a receiving station at a predetermined time during the cycle of unloading a multi-deck rack.

It is still another object of the present invention to provide apparatus of the foregoing character which is constructed and arranged to position automatically a loaded multi-deck rack in unloading position each time a preceding multi-deck rack has been unloaded so that the unloading operation will be continuous.

Other objects of this invention will appear in the following description and appended claims, reference being had to the accompanying drawings forming a part of this specification wherein like reference characters designate corresponding parts in the several views.

In the drawings:

Figure 1 is a side elevation illustrating one embodiment of the present invention; and Figure 2 is a top plan of the embodiment illustrated in Figure 1.

Figure 3 is an enlarged fragmentary view of a portion of the embodiment illustrated in Figure 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, a more detailed description of the present invention will be given. The block transferring apparatus 10 includes an elevator 12 which raises and lowers the receiving conveyor 14. The latter is supported by the chains 16 which are attached at their oposite ends to the receiving conveyor 14 and the counterweight 18. An elevator motor 20 is drivingly connected, through a suitable synchronizing gear 22, to the shafts 24 on which the sprocket wheels 26 are mounted. Thus, when the motor 20 is turned the shafts 24 will be turned, and through pulley wheels 26 and chains 16, the receiving conveyor 14 will be raised or lowered, depending on the direction of rotation of motor 20.

The framework for the elevator 12 includes the stationary vertical beams 28 at one end and the stationary vertical beams 30 at the other end of the elevator 12. Tracks, not shown, are formed on the inner sides of these beams on which the receiving conveyor 14 is adapted to ride.

Mounted on one end of the receiving conveyor 14 is a rigid plate 32 which is open in its central portion for the passage of blocks therethrough and which overlies the vertical beams 30. Connected to the plate 32 is a block unloader mechanism 34 which includes the parallel cantilever beams 36 rigidly secured to plate 32 and the block pusher mechanism 38 suspended from the free end of cantilever beam 36. The block pusher mechanism 38 has a plurality of rigid frame members 40, and a shaft 42 is journaled under the beams 36 with the arms 44 and 46 connected thereto for turning therewith. A hydraulic piston and cylinder 48 is connected at its one end to the free end of arm 44 and at its other end to the stationary bracket 50. Thus, expansion of the hydraulic piston and cylinder 48 will cause shaft 42 to rotate in a clockwise direction as seen in Figure 1, and retraction of the hydraulic piston and cylinder 48 will cause shaft 42 to rotate in a counter-clockwise direction. The arms 46 which are connected to shaft 42 are thereby turned in the same clockwise and counter-clockwise directions. The free ends of arms 46 are operatively connected to the block pushers 52 for moving the latter horizontally toward and from the elevator 12 for a purpose to be more fully described.

Referring to Figure 3, a brief description will be given of the manner in which the arms 46 and the block pushers 52 are operatively connected. A carrier 54 has wheels 56 at its four corners which are adapted to travel in tracks 58 in the inner side of lower frame members 40. Links 60 are pivotally connected respectively at one end to the carrier 54 by the pins 62 and at the other end to the arms 46 by the pins 64. Thus, the links 60 will accommodate the vertical component of movement of arms 46 while the horizontal component of movement will be transmitted to the carrier 54. Since the carrier 54 has the block pushers 52 rigidly attached thereto, the horizontal movements will be transmitted to such block pushers 52. In this manner actuation of hydraulic piston and cylinder 48 will effect horizontal movement of block pushers 52.

Positioned between the receiving conveyor 14 and the block pusher mechanism 38 is a rack loading and unloading conveyor 64 which has rails 66 and 68 on which a multi-deck rack 70 can travel. A rack actuating bar 72, Figure 2, is positioned at one end of conveyor 64 and is movable by means of the hydraulic piston and cylinder assembly 74. The end of conveyor 64 at which piston and cylinder assembly 74 is located is the station on which a fully loaded rack 70 will be placed. Actuation of the bar 72 will move the rack 70 to the position shown in Figure 1 between the receiving conveyor 14 and the block pusher mechanism 38. Here the blocks will be removed from the rack 70, in a manner to be described, and then the empty rack 70 will be pushed to the other end of conveyor 64 for removal.

The racks used for this operation are of a conventional type having a framework adapted to support the blocks on pallets at six deck levels. The spacing between decks is kept at a minimum so that the maximum number of blocks can be carried in a given volume within the racks.

As was previously stated, the blocks on the multi-deck rack 70 are supported thereon by pallets, and it is desired to leave the empty pallets in place on the rack 70 when the blocks are being unloaded. For this purpose, a reciprocable pallet stopper 73 is provided in horizontal alignment with the pallet (not shown) which is located on the deck in alignment with the receiving conveyor 14. A hydraulic piston and cylinder assembly 73a is mounted on the receiving conveyor 14 and by suitable linkages 73b is connected to the pallet stopper 73 so as to cause reciprocable movement thereof on expansion and contraction of piston and cylinder assembly 73a. The piston and cylinder assembly 73a is in a hydraulic circuit, to be described, which includes the piston and cylinder assembly 48 so that the block pusher 52 and the pallet stopper 73 will be advanced substantially simultaneously. The pallet stopper 73 will engage the pallet (not shown) and the block pusher 52 will engage the block thereon pushing the same onto the receiving conveyor 14. The pallet stopper 73 and the block pusher 52 will then be returned substantially simultaneously to the normal positions.

Positioned at the remote end of the receiving conveyor 14 from the block pusher mechanism 38 is a cubing table 75 which has a roller conveyor 76 on its upper surface. The cubing table 75 is adapted to receive an entire rack of blocks from the receiving conveyor 14. The blocks are normally transferred from the receiving conveyor 14 to the cubing table 75 when the unloading conveyor 14 is at the bottom of its vertical travel.

This transferring operation is carried out by means of a sweep bar 78 carried on a pair of endless chains 80 which extend lengthwise on opposite sides of the receiving conveyor 14. The chains 80 extend around the wheels 82 which are supported by brackets 84 on a shaft at the one end of receiving conveyor 14. At the other end of receiving conveyor 14 the chains 80 pass around the two sets of pulley wheels 86 which are supported by brackets (not shown) mounted on the receiving conveyor 14. A sweep motor 88 is drivingly connected to the chains 80 for turning the chains 80 at selected times around the pulley wheels 82 and 86, thereby moving the sweep bar 78 outside the right end of the blocks 90, Figure 1, and thereafter moving the sweep bar to the left to sweep all blocks 90 off the receiving elevator 14 onto the cubing table 75. This sweep operation will be performed when the receiving conveyor 14 is level with the cubing table 75. The sweep bar 78 will then return to its normal position shown in Figure 1.

After the blocks have been positioned on the cubing table 75 they can be removed by various means, one of which is illustrated in Figure 1. Here a cubing hoist 92 is transversely movable on a cross track 94, and the latter is supported on wheels 96 on the tracks 98 for movement away from cubing table 75. The cubing hoist 92 is of a conventional design having a hydraulic piston and cylinder assembly 100 for lifting blocks from the cubing table 75 and transporting them to a storage place. The cubing hoist 92 is illustrated in Figure 1 after having lifted six blocks from the cubing table 75 and after having been turned ninety degrees so that the ends of the blocks are visible.

Located on the top of the elevator 12 is an electric motor 102 for driving the hydraulic pump 104. There are two outlets from the pump 104, one being shown at 106 which is connected by suitable conduits (not shown) to the piston and cylinder assemblies 48 and 73a so that these units will be actuated simultaneously, as was previously described. The other of the outlets, identified by reference number 108, is connected by a suitable conduit (not shown) to the piston and cylinder assembly 74 for moving the multi-deck racks 70 on the conveyor 64.

Thus, it can be seen that all the movable parts of the present invention can be actuated by electrical or hydraulic means. If desired the complete cycle of operation can be carried out by selecting proper push buttons on an instrument panel (not shown), or the cycle can be completed by automatic operation wherein limit switches are employed. For this purpose limit switches 110 and 112 are mounted on the frame members 40 to be engaged by one of the arms 46 at the ends of its normal path of movement. Limit switch 112 is in an electric circuit which will cause piston and cylinder assemblies 48 and 73a to retract thereby withdrawing the pallet stopper 73 and block pusher 52 to their normal starting positions. Limit switch 110 is in an electric circuit including electric motor 20 so that when limit switch 110 is closed by the return of arm 46, the electric motor 20 will be energized lowering the receiving conveyor 14 to the next lower deck level of the multi-deck rack 70. The electric motor 20 is stopped by means of a limit switch 114 mounted on the one stationary vertical beam 30 and adapted to be contacted in sequence by each of the cams on the limit switch cams 116 mounted on the plate 32 for vertical movement therewith. The limit switch 114 is in an electric circuit with the electric motor 20 which circuit is normally closed but which is opened when one of the cams contacts limit switch 114, such circuit then remaining open until closed again by actuation of limit switch 110 by arm 46. Thus, once the operation of the block pusher 52 has been started in unloading blocks from the top deck of the multi-deck rack 70, each of the next succeeding decks will be unloaded in sequence until the lowermost deck has been unloaded.

When the receiving conveyor 14 is at its lowermost level the limit switch 118, positioned on beam 30, will have been contacted by the uppermost of cams 116, thereby setting up a circuit with sweep motor 88 but such circuit will remain open until closed by action of limit switch 110 on the return stroke of arm 46. The limit switch 118 also serves to open the circuit to elevator motor 20 to prevent overrun of the receiving conveyor on the down travel.

At this phase of the cycle, closing of the limit switch 110 will close a circuit including the sweep motor 88 thereby causing the sweep bar 78 to be advanced over and behind the blocks on the receiving conveyor 14 and to sweep the length of receiving conveyor 14 transferring the blocks on to the cubing table 74. The sweep bar 78 will then engage the limit switch 120 opening the forward sweep circuit to the electric sweep motor 88 and starting the return sweep circuit of the sweep motor 88, and simultaneously closing a circuit to the elevator motor 20, causing the receiving table 14 to be raised to its uppermost position.

When the sweep bar has returned and contacted the limit switch 122, the latter will open the circuit to the sweep motor 88, thereby stopping the same. The switch 122 is also in a circuit where it will act with limit switch 124, on the beam 30, for starting a new cycle of operation. In this respect, limit switch 124 will be contacted by the lowermost of the limit switch cams 116 when the receiving conveyor 14 reaches its uppermost position. This will have the effect of opening the circuit to the elevator motor 20 which served to raise the receiving conveyor 14 and sets up the aforesaid circuit with the sweep return limit switch 122 for starting a new cycle. This circuit also includes a limit switch 126 on the rail 68 of the rack conveyor 64 which is normally open and which will close after the unloaded rack 70 has been moved from between the receiving conveyor 14 and the block pusher mechanism 38 and a loaded rack has been pushed in place thereof by the actuator bar 72.

Thus, it can be seen that a complete cycle can be performed automatically of moving a loaded rack 70 to a position between the receiving conveyor 14 and the block pusher mechanism 38, pushing the blocks from each deck in sequence on to the receiving conveyor 14, when the last deck has been unloaded sweeping the blocks from the receiving conveyor 14 on to the cubing table 75, returning the sweep bar 78 to its starting position while the receiving conveyor 14 is being raised to its uppermost position, replacing the unloaded rack 70 with a fully loaded rack 70, and thereafter repeating the entire cycle.

Having thus described our invention, we claim:

1. Block transferring apparatus for unloading a multi-deck rack adapted to be moved on horizontal tracks and to carry blocks on the decks thereof, said apparatus comprising an elevator with a horizontally disposed receiving conveyor positioned normal to the intended path of movement of said rack and with the receiving end adjacent one side of said intended path of movement, means forming a part of said elevator for stopping said receiving conveyor sequentially at levels corresponding to those of each of the decks of said rack, a block unloader mounted on said elevator for vertical movement therewith and having a block pusher positioned on the opposite side of the intended path of movement of said rack so that on advancement of said pusher the blocks on the deck corresponding to the level of the receiving conveyor will be pushed on to said receiving conveyor, and means for advancing and retracting said pusher in sequence after said elevator has stopped at each of said levels.

2. Block transfer apparatus for unloading a multi-deck rack adapted to be moved on horizontal tracks and to carry blocks on the decks thereof, said apparatus comprising an elevator with a horizontally disposed receiving conveyor positioned normal to the intended path of movement of said rack and with the receiving end adjacent one side of said intended path of movement, the upper surface of said receiving conveyor including a series of parallel horizontal rollers positioned transverse to the length of the conveyor, means forming a part of said elevator for stopping said receiving conveyor sequentially at levels corresponding to those of each of the decks of said rack, a block unloader mounted on said elevator for vertical movement therewith and having a block pusher positioned on the opposite side of the intended path of movement of said rack so that on advancement of said pusher the blocks on the deck corresponding to the upper surface of said receiving conveyor will be pushed on to the horizontal rollers of said receiving conveyor, and means for advancing and retracting said pusher in sequence after said elevator has stopped at each of said levels.

3. Block transfer apparatus for unloading a multi-deck rack adapted to be moved on horizontal tracks and to carry blocks on the decks thereof, said apparatus comprising an elevator with a horizontally disposed receiving conveyor positioned normal to the intended path of movement of said rack and with the receiving end adjacent one side of said intended path of movement, the upper surface of said receiving conveyor including a series of parallel horizontal rollers positioned transverse to the length of the conveyor, means forming a part of said elevator for stopping said receiving conveyor sequentially at levels corresponding to those of each of the decks of said rack, a block unloader mounted on said elevator for vertical movement therewith and having a block pusher positioned on the opposite side of the intended path of movement of said rack so that on advancement of said pusher the blocks on the deck corresponding to the upper surface of said receiving conveyor will be pushed on to the horizontal rollers of said receiving conveyor, means for advancing and retracting said pusher in sequence after said elevator has stopped at each of said levels, a sweep bar mounted on said elevator so as to be movable the length of said receiving conveyor above said rollers to sweep all blocks thereon off the discharge end of said receiving conveyor and subsequently to be returned to the receiving end of said receiving conveyor, and means for actuating said sweep bar at a predetermined time in the unloading cycle of said elevator.

4. Block transferring apparatus for unloading a multi-deck rack adapted to be moved on horizontal tracks and to carry blocks on the decks thereof, said apparatus comprising an elevator with a horizontally disposed receiving conveyor positioned normal to the intended path of movement of said rack and with the receiving end adjacent one side of said intended path of movement, means for stopping said elevator sequentially at levels corresponding to those of each of the decks of said rack, a block unloader mounted on said elevator for vertical movement therewith and having a block pusher positioned on the opposite side of the intended path of movement of said rack so that on advancement of said pusher the blocks on the deck corresponding to the level of the receiving conveyor will be pushed on to said unloading conveyor, means for advancing and retracting said pusher in sequence after said elevator has stopped at each of said levels, a sweep bar mounted so as to be movable the length of said receiving conveyor to sweep all blocks thereon off the discharge end of said receiving conveyor and subsequently to be returned to the receiving end of said receiving conveyor, and means for actuating said sweep bar at a predetermined time in the unloading cycle of said elevator.

5. Block transferring apparatus for unloading a multi-deck rack adapted to be moved on horizontal tracks and to carry blocks on the decks thereof, said apparatus comprising an elevator with a horizontally disposed receiving conveyor positioned normal to the intended path of movement of said rack and with the receiving end adjacent one side of said intended path of movement, means for stopping said receiving conveyor sequentially at levels corresponding to those of each of the decks of said rack, a block unloader mounted on said elevator for vertical movement therewith, said unloader including a cantilever construction attached to the receiving end of said receiving conveyor and adapted to extend over said tracks to the opposite side thereof, a block pusher suspended from the free end of said cantilever construction and adapted to push blocks from the rack on to the receiving conveyor, and means for advancing and retracting said pusher in sequence after said elevator has stopped at each of said levels.

6. Block transferring apparatus for unloading a multi-deck rack adapted to be moved on horizontal tracks and to carry blocks on the decks thereof, said apparatus comprising an elevator with a horizontally disposed receiving conveyor positioned normal to the intended path of movement of said rack and with the receiving end adjacent one side of said intended path of movement, means for stopping said elevator sequentially at levels corresponding to those of each of the decks of said rack, a block unloader mounted on said elevator for vertical movement therewith and having a block pusher positioned on the opposite side of the intended path of movement of said rack so that on advancement of said pusher the blocks on the deck corresponding to the level of the receiving conveyor will be pushed on to said unloading conveyor, means for advancing and retracting said pusher in sequence after said elevator has stopped at each of said levels, a cubing table having its top surface in horizontal alignment with and adjacent to the top surface of said receiving conveyor when the latter is positioned at its lowermost level, a sweep bar mounted so as to be movable the length of said receiving conveyor to sweep all blocks thereon off the discharge end of said receiving conveyor on to said cubing table and subsequently to be returned to the receiving end of said receiving conveyor, and means for actuating said sweep bar to transfer the blocks from said receiving conveyor to said cubing table at a predetermined time in the unloading cycle of said elevator.

7. Block transferring apparatus as defined in claim 6 wherein the upper surfaces of said receiving conveyor and said cubing table include a series of parallel horizontal rollers positioned transversely of the length of the unloading conveyor.

8. Block transferring apparatus as defined in claim 6 wherein said block unloader comprises a cantilever construction projecting from the receiving end of the receiving conveyor and adapted to extend over said horizontal tracks, and the block pusher is suspended from the free end thereof and is adapted to engage blocks on a rack at the level of the receiving conveyor and to push such blocks on to said receiving conveyor.

9. In combination, a horizontally disposed rack conveyor, a plurality of multi-deck racks on said rack conveyor adapted to carry a plurality of blocks, block transferring apparatus for unloading in sequence the racks on said rack conveyor comprising an elevator with a horizontally disposed receiving conveyor positioned normal to said rack conveyor with the receiving end of the receiving conveyor level with the lowest decks of said racks, said elevator being movable vertically to a stationary position level with the uppermost decks of said racks, means for lowering and stopping said elevator in sequence at the level of each of the decks below said uppermost decks, a block unloader mounted on said elevator for vertical movement therewith and having a block pusher positioned on the opposite side of said rack conveyor so that on advancement of said pusher the blocks on the deck corresponding to the level of the receiving conveyor will be pushed on to said receiving conveyor and means for advancing and retracting said pusher in sequence after said elevator has stopped at each of said levels, and means for intermittently moving the unloaded rack from between said elevator and said block unloader and replacing it with a loaded rack, said last named means operating after said pusher has been retracted from the lowermost deck of the rack being unloaded.

10. In combination, a horizontally disposed rack conveyor, a plurality of multi-deck racks on said rack conveyor adapted to carry a plurality of blocks, block transferring apparatus for unloading in sequence the racks on said rack conveyor comprising an elevator with a horizontally disposed receiving conveyor positioned normal to said rack conveyor with the receiving end of the receiving conveyor level with the lowest decks of said racks, said elevator being movable vertically to a stationary position level with the uppermost decks of said racks, means for lowering and stopping said elevator in sequence at the level of each of the decks below said uppermost decks, a block unloader mounted on said elevator for vertical movement therewith and having a block pusher positioned on the opposite side of said rack conveyor so that on advancement of said pusher the blocks on the deck corresponding to the level of the receiving conveyor will be pushed on to said receiving conveyor, means for advancing and retracting said pusher in sequence after said elevator has stopped at each of said levels, a sweep bar mounted on said elevator so as to be movable the length of said unloading conveyor to sweep all blocks thereon off the discharge end of said receiving conveyor and subsequently to be returned to the receiving end of said receiving conveyor and means for actuating said sweep bar when the elevator is stationary at a preselected one of said levels, and means for intermittently moving the unloaded rack from between said elevator and said block unloader and replacing it with a loaded rack, said last named means operating after said pusher has been retracted from the lowermost deck of the rack being unloaded.

11. The combination claimed in claim 10, wherein said receiving conveyor carries a pallet stopper adapted to be in alignment with the deck of the rack being unloaded, and means for advancing said pallet stopper to engage the pallet on said deck simultaneously with the advancement of said pusher.

12. In combination, a horizontally disposed rack conveyor, a plurality of multi-deck racks on said rack conveyor adapted to carry a plurality of blocks, block transferring apparatus for unloading in sequence the racks on said rack conveyor comprising an elevator with a horizontally disposed receiving conveyor positioned normal to said rack conveyor with the receiving end of the receiving conveyor level with the lowest decks of said racks, said elevator being movable vertically to a stationary position level with the uppermost decks of said racks, means for lowering and stopping said elevator in sequence at the level of each of the decks below said uppermost decks, a block unloader mounted on said elevator for vertical movement therewith and having a block pusher positioned on the opposite side of said rack conveyor so that on advancement of said pusher the blocks on the deck corresponding to the level of the receiving conveyor will be pushed on to said receiving conveyor, means for advancing and retracting said pusher in sequence after said elevator has stopped at each of said levels, a cubing table having its top surface in horizontal alignment with and adjacent to the top surface of said receiving conveyor when the latter is positioned at its lowermost level, a sweep bar mounted on said elevator so as to be movable the length of said receiving conveyor to sweep all blocks thereon off the discharge end thereof on to said cubing table and subsequently to be returned to the receiving end of said receiving conveyor and means for actuating said sweep bar when the elevator is stationary at the lowermost of said levels, and means for intermittently moving the unloaded rack from between said elevator and said block unloader and replacing it with a loaded rack, said last named means operating after said pusher has been retracted from the lowermost deck of the rack being unloaded.

References Cited in the file of this patent

UNITED STATES PATENTS

| | | |
|---|---|---|
| 1,507,864 | Smith | Sept. 9, 1924 |
| 2,661,100 | Ashford | Dec. 1, 1953 |
| 2,679,323 | Patterson | May 25, 1954 |
| 2,718,972 | Temple | Sept. 27, 1955 |
| 2,843,278 | Oveflander | July 15, 1958 |